United States Patent [19]

Zaizen et al.

[11] Patent Number: 4,535,034

[45] Date of Patent: Aug. 13, 1985

[54] HIGH AL HEAT-RESISTANT ALLOY STEELS HAVING AL COATING THEREON

[75] Inventors: Takashi Zaizen; Yasuo Otoguro; Mikio Yamanaka, all of Kanagawa; Shozo Yamane, Tokyo, all of Japan

[73] Assignee: Nippon Steel Corporation, Tokyo, Japan

[21] Appl. No.: 567,343

[22] Filed: Dec. 30, 1983

[51] Int. Cl.³ ............................................... C23C 1/08
[52] U.S. Cl. .................................... 428/653; 428/681; 420/584; 75/124
[58] Field of Search ................ 420/584; 428/653, 681; 427/376.7, 436; 75/124 F

[56] References Cited

U.S. PATENT DOCUMENTS 1,706,130  3/1929  Ruder .................................. 428/653
3,989,514  11/1976  Fujioka et al. ...................... 420/584
4,086,085  4/1978  McGurty ............................. 420/584
4,248,629  2/1981  Pons et al. .......................... 420/584
4,357,394  11/1982  Khandros ........................... 428/653

Primary Examiner—L. Dewayne Rutledge
Assistant Examiner—Debbie Yee
Attorney, Agent, or Firm—Cushman, Darby & Cushman

[57] ABSTRACT

A high-Al heat resistant steel comprising a base steel containing not more than 0.7% C, not more than 3.0% Si, not more than 2.0% Mn, 10 to 40% Ni, 9 to 30% Cr, 2 to 8% Al, with balance being Fe and unavoidable impurities, and an Al coating formed on the base steel. The Al coating diffuses into the base steel to form an intermediate Al alloyed layer during the Al coating or by heating after the coating, which alloyed layer prevents the Al coating from spalling, thus providing excellent resistance to oxidation, corrosion, carburization, nitrization and sulphurdization at elevated temperatures.

12 Claims, No Drawings

HIGH Al HEAT-RESISTANT ALLOY STEELS HAVING Al COATING THEREON

BACKGROUND OF THE INVENTION

Field of the Invention

The present invention relates to heat-resistant alloy steels having improved resistance to oxidation, and corrosion at elevated temperatures as well as to carburization, nitrization and sulphurdization.

In recent years, metal materials used in equipments related to energy industries, such as coal liquefaction and gassification, MHD, distillation of oil shale and tar sand and petroleum processing, have been encountering more and more severe high temperature service environments.

The problem common to these applications is that the metal materials used in these equipments are severely attacked by oxidation and corrosion by the high concentration of S, Cl Na, K, P, C or their compounds, and in some cases, by the elevated temperature service environments containing molten salts, such as sulfates and carbonates. In these service environments, conventional stainless steels and heat resistant steels have been found to show only poor resistance to the oxidation and corrosion at elevated temperatures, and heat-resistant materials with increased resistance to these attacks have been in urgent demand. Also in the fields of furnaces for heating metal and refractory materials, furnace damages due to oxidation, carburization, nitrization, etc. in various high temperature service environments have long been a serious problem to be solved. Furthermore, from the viewpoint of energy conservation, there is a recent tendency to eliminate water cooling, and to replace the part with heat-resistant materials. In this respect, the further improvement of heat resistance of these materials have been in ever increasing demand.

For the purpose of increasing the resistance of heat-resistant steel materials to oxidation and corrosion at elevated temperatures in general, it is effective to increase the contents of Cr, Si and Al in the steel materials. However, excessive contents of these elements tend to deteriorate the fluidity of molten metal and the toughness and ductility required in their hot working and cold working, resulting in poor productivity, workability and service performance. Therefore, the addition of these elements are limited.

In order to solve the above contradictions, various proposals have been made, such as applying Al coatings on austenite stainless steels, Ni-base or Co-base heat-resistant alloys, or diffuse the Al coatings into the base metals, as disclosed in Japanese Laid-Open Patent Specification No. Sho 55-97460, Japanese Patent Publication No. Sho 56-505, "Journal of Metals" G. W. Goward, Oct. 1970, Vol. 31 and Nippon Gakujutsu Shinko-kai No. 123 Committee Report Vol. 19, No. 2, page 233, July 1978.

In these prior arts, the proposals for Ni-base alloys or Co-base alloys are of less practical use because of their very high material costs. On the other hand, some of austenite stainless steels and heat-resistant cast steels coated with Al or surface-diffused with Al are used in partial applications. However, these Al-coated or Al-diffused steel materials have encountered the following problems.

The Al coated or diffused on the steel surface, when used at a service temperature higher than the melting point of Al, mutually diffuses with the steel surface, forming distinctive two layers: an alloy layer with higher Al content and a diffused layer with lower Al content beneath the former, and between these two layers of different Al contents a lot of voids are formed in line due to the difference in the metallic diffusion rate, so that the high Al alloy layer spalls off to expose the low-Al diffused layer to the high temperature environments. Although the low-Al diffused layer thus left has better resistance to oxidation and corrosion at elevated temperatures than the metal base without the Al coating, the Al content in the layer gradually decreases as Al diffuses into the matrix of the base steel, and eventually the effect of the Al coating is nullified. In some cases, the low-Al diffused layer may spall off at the boundary between the diffused layer and the base steel. For these reasons, the Al coating or Al diffusion on austenite stainless steels or heat-resistant cast steels are not reliable, because they cannot maintain their desired effects for a long period of service time.

Meanwhile an art of applying paint coating containing powdered Al on Al-containing stainless steels is disclosed in Japanese Laid-Open Patent Specification No. Sho 54-123534. However, this prior art is to form a stable $Al_2O_3$ film by firing on the steel which is difficult to form a uniform $Al_2O_3$ film thereon because of internal oxides etc. caused by hot working. Thus according to this prior art, Al in the paint coating is oxidized during a heating process or an initial stage of soaking process where the Al in the steel does not fully diffuse, so as to temporarily prevent intervention of oxygen to the steel surface, and hence prevent further internal oxidation of the steel, and at the stage when all Al in the paint coating is oxidized the Al in the steel is allowed to fully diffuse so that a selective oxidation of Al takes place on the surface of the steel, forming a uniform $Al_2O_3$ film thereon.

However, this prior art suggests nothing of the formation of alloy layer, and particularly the technical problem encountered by the prior art of Japanese Laid-Open Patent Specification No. Sho 55-97460 and Japanese Patent Publication No. Sho 56-505, etc., and cannot solve the technical problem, because powdered Al dispersed in the paint coating, etc. cannot form an Al alloyed layer.

SUMMARY OF THE INVENTION

The present invention has been completed for the purpose of overcoming the technical problems encountered by the prior arts.

Therefore, one of the objects of the present invention is to provide high-Al heat resistant alloy steels which are free from the technical problems encountered when the surface portion of heat resistant steels is enriched with Al, and which can maintain the desirable effects inherent to Al coatings for a long period of time under service conditions.

Through the inventors' extensive experiments and investigations on the behaviour of various Al coating applied on the surface of various heat resistant steels, it has been found that in cases of heat resistant steels which are predominantly austenitic, when an Al coating is applied on the surface of the base steel containing not less than 2% Al, and this steel is heated at a temperature above 500° C., mutual diffusion takes place between the coated Al and the steel surface, forming a high-Al alloy layer and a diffused layer of intermediate Al content beneath the former, but voids are scarcely formed between these two layers. Thus the high-Al alloy layer does not spall off during the service at high temperature. Accordingly, the steel shows an excellent heat resistance because the high-Al alloy layer is long preserved on the steel surface.

Therefore, according to the present invention, a high-Al heat-resistant steel is provided, which has a steel composition comprising not larger than 0.7% C, not larger than 3% Si, not larger than 2% Mn, 10 to 40% Ni, 9 to 30% Cr, 2 to 8% Al with the balance being Fe and unavoidable impurities, and has a coating substantially composed of Al applied on its surface. The Al-coated steel according to the present invention, when exposed to elevated temperatures, forms a high-Al alloy layer and a diffused layer of intermediate Al content as the result of mutual diffusion, and the alloyed layer formed in this way does not spall off during the service time and the desired effects of the Al coating can be maintained for a long period of service time so that excellent resistance to oxidation and corrosion at elevated temperatures are achieved.

Meanwhile, when the Al-coated steel according to the present invention is exposed abruptly to elevated temperatures far beyond the melting point of Al, say about 1200° C. in service, the Al coating tends to melt without desired mutual diffusion into the base steel. Therefore, in such cases, it is desirable to preheat the Al-coated steel at about 900° C. for about 8 hours so as to form the desired Al alloyed layer.

DETAILED DESCRIPTION OF THE INVENTION

Explanations will be made on various limitations of the alloy composition of the base steel on which the Al coating is applied.

Carbon is effective to stabilize the austenite structure and to increase the strength of the base steel at elevated temperatures, but carbon contents in excess of 0.7% will lower the toughness and ductility and causes lowering of the resistance to thermal stress cracking. Therefore, in the present invention, the upper limit of the carbon content is set at 0.7%.

Silicon improves resistance both to the carburization and oxidation of the base steel. However, in the present invention these properties are well achieved by aluminum enriched in the steel surface layer and therefore 3.0% or less Si is enough. Also the Si content should be determined in balance with contents of C and Al in the base steel for the purpose of improving the fluidity of molton steel. However, Si contents exceeding 3.0% will lower the toughness and the resistance to the thermal stress cracking. For these reasons the upper limit of the Si content in the base steel is set at 3.0% in the present invention.

Manganese is a favourable austenite forming element, but Mn contents over 2.0% will deteriorate the oxidation resistance. Therefore, the upper limit is set at 2.0%.

Nickel is an essential element for forming the γ phase which maintains the desired strength at elevated temperatures of the heat-resistant base steel, and for this purpose at least 10% Ni is necessary. On the other hand, Ni contents beyond 40% will increase the material cost and deteriorate the resistance to sulphurdization. Therefore, the nickel content is limited to 40% max.

Chromium is an element which denotes the basic resistance to oxidation and corrosion at high temperatures, and for this purpose at least 9% Cr is required. However, Cr contents more than 30% will cause marked deterioration of the material quality, such as toughness.

Aluminum is effective to increase the resistance to oxidation and corrosion at elevated temperatures of the base steel. In addition, Al is required for the purpose of preventing the spalling off of the high-Al alloy layer formed by alloying between coated Al and the steel surface.

For these purposes, at least 2% Al is required to be present in the base steel. However, Al contents more than 8% will severely deteriorate the material quality such as toughness. Therefore, in the present invention, the upper limit of the Al content is set at 8%.

In addition to the above elements, one or more of Ti, Zr, Nb, Ta, Sc, Y, La, Ce, Co, Cu, Mo, W, Ca, Mg, B, etc. may be added in the base steel for various purposes of increasing the resistance to oxidation, and improving hot workability, high temperature strength and so on, and their contents may be determined depending on specific purposes.

The heat-resistant steel according to the present invention is predominantly austenitic in the structure, but may contain some ferrite phase and Cr-carbide phase.

As the method of applying the Al coating on the base steel, the coating may be achieved by, in addition to an ordinary hot dipping process, diffusion coating (calorizing), metallizing, baking by laser, and electroplating. The effective thickness of Al coating is 1 to 500 μm.

The Al coating may contain one or more of Si, Cr, Mo, Ti, Nb, Zr, Hf, Th, Sc and rare earth elements, such as Y and Ce.

Regarding the preparation of the heat-resistant steel on which the Al-coating is applied, it may be prepared by the conventional process, such as a continuous casting process and an ingot-making process including breaking down, rolling or forging.

Additionally, it may also be prepared by casting (including centrifugal casting) the steel directly into a final shape.

DESCRIPTION OF PREFERRED EMBODIMENTS

The present invention will be better understood from the following preferred embodiments.

EXAMPLE 1:

Test pieces (2t×20w×50l mm) having various chemical compositions (in weight percent) shown in Table 1 were applied on their surfaces with Al coating by the conventional hot dipping process. The thickness of the Al coating layer on one surface of the test pieces ranged from 20 to 500 μm, beneath which was formed an Al alloyed layer of 20 to 30 μm. These test pieces were subjected preliminarily to a heat treatment at 900° C. for 8 hours in air, so as to alloy the Al coating layer with the surface of the base steel to form an uppermost layer of high Al content, then the test pieces were subjected to a repeated intermittent heat treatment comprising holding them for 30 minutes in an electric furnace maintained at 1200° C. in a mixture gas atmosphere containing exhaust gas from a gasoline engine and air, and cooling them in air for 30 minutes. Then the weight losses of the test pieces after the repetition of intermittent heating were measured. The test results revealed that all of the comparative steels showed the spalling of the alloyed layer which started after 13 to 25 cycles of the intermittent heating and as shown in Table 2, they showed severe weight losses during further cycles of the intermittent heating, until they all turned to black after 150 cycles of the intermittent heating. This fact indicates that no Al₂O₃ film was formed any more at this stage, but instead a spinel oxide film of (Fe.Cr)₃O₄ was formed.

Whereas all of the steels according to the present invention showed completely no spalling of the alloyed layer even after 150 cycles of the intermittent heating only with slight weight increases as shown in Table 2 and all had a brownish surface color. This fact indicates a rigid film composed mainly of Al₂O₃ was formed on the surfaces of the test pieces, thus providing excellent resistance to oxidation.

EXAMPLE 2

Of the steel compositions shown in Table 1, test pieces in the form of round bar (22φ×200l mm) were prepared from HK-40 (comparative steel) and A-5 (present invention) and were applied with Al coating by a conventional hot dipping process. These Al coated test pieces were used as pins for holding tiles in a tile baking furnace for roof tiles in which tiles were supported by the pins so as to prevent their falling down, and the tiles and pins were subjected to a heating cycle of room temperature →1200° C.–1250° C.→room temperature. After about 7 month service in the furnace under the heating condition as above, the shape of these pins were measured.

The results showed decrease in diameter in all of the test pieces of HK-40 coated with Al, with an average decreases in diameter of 3.9 mm, but showed no such diameter decrease in all of the test pieces of the steel A-5 coated with Al despite slight partial peeling off of the surface layer.

EXAMPLE 3

Welded pipes of 210φ×1000l×10t mm were prepared from a hot rolled strip of the steel A-2 (present invention) shown in Table 1 by forming and welding, and Al coatings were applied onto the inside and outside surfaces of these pipes by a conventional hot dipping method. These Al coated pipes were used as radiant tubes in a continuous annealing furnace at positions where the damage probability is highest due to direct exposure to the barner flame, and where the temperature may often rise to 1000° C. or higher despite an average furnace temperature of 800° to 930° C. Where the tubes are exposed to the burner flame, the inside wall surface of the pipes are usually subjected to carburization, sulphurdization and oxidation to form abnormal scale, and the probability of cracking at these positions is very high, because the pipe abnormally deforms due to their internal stress caused by the carburization. With the use of the steel pipes according to the present invention at these critical positions, no formation of the abnormal scale or no occurrence of the cracking was observed even after 6 month service and the furnace was continuously operated satisfactorily thereafter.

As shown and understood from the foregoing embodiments of the present invention, the steels according to the present invention show high resistance to an oxidizing and highly corrosive atmosphere at elevated temperatures, and can be advantageously used as structural materials, such as radiant tubes, recuperators, hearth rolls, conveyer belts, skids, various heat insulators in heating furnaces, annealing furnaces, heat treating furnaces, baking furnaces, thermal power plant boilers and high-temperature components, such as chemical reactors, reactor pipes, heat exchangers, transfer pipes in coal liquefaction and gassification processes, MHD, cracking processes of oil shale and tar sands, petroleum distillation processes, petro-chemical processes and other chemical processes.

The present invention has a particular advantage when used in various equipments operated at elevated temperatures where the energy cost is of most concern.

TABLE 1

| Test Pieces | C | Si | Mn | Ni | Cr | Al | Others |
|---|---|---|---|---|---|---|---|
| Comparative Steel | | | | | | | |
| H H | 0.32 | 1.03 | 1.12 | 12.8 | 24.4 | — | — |
| HK-40 | 0.41 | 0.97 | 0.88 | 20.9 | 24.7 | — | — |
| AISI310S | 0.054 | 0.51 | 1.39 | 19.7 | 25.2 | — | — |
| I-800 | 0.059 | 0.72 | 1.08 | 32.2 | 20.3 | 0.54 | Ti: 0.4 |
| Present Invention | | | | | | | |
| A - 1 | 0.078 | 0.53 | 1.54 | 23.2 | 22.4 | 2.10 | Ti: 0.3 |
| A - 2 | 0.023 | 0.59 | 0.33 | 23.9 | 16.7 | 4.93 | Ce: 0.06 |
| A - 3 | 0.030 | 0.72 | 0.61 | 22.2 | 17.3 | 5.38 | Zr: 0.23, Y: 0.04 |
| A - 4 | 0.15 | 0.63 | 0.74 | 35.3 | 12.0 | 6.79 | Mo: 0.79, Ce: 0.05 |
| A - 5 | 0.38 | 1.03 | 0.45 | 31.4 | 23.1 | 5.64 | Ti: 0.2, Nb: 0.2, Ce: 0.05 |
| A - 6 | 0.45 | 1.07 | 0.53 | 28.3 | 15.2 | 7.58 | Ce: 0.05, La: 0.01, Ca: 0.001 |
| A - 7 | 0.42 | 1.05 | 0.60 | 26.7 | 17.8 | 5.62 | CU: 1.2, Y: 0.04 |
| A - 8 | 0.23 | 0.98 | 0.82 | 23.3 | 24.6 | 4.67 | Co: 5.2, Ce: 0.05 |

TABLE 2

| Test Pieces | Weight Changes of Test Pieces after 150 Cycles of Intermittent Heating | Color of Test Pieces after 150 Cycles of Intermittent Heating |
|---|---|---|
| Comparative Steel | | |
| H H | −110 mg/cm² | Black |
| HK-40 | −81 mg/cm² | " |
| AISI310S | −76 mg/cm² | " |
| I-800 | −143 mg/cm² | " |
| Present Invention | | |
| A - 1 | +2 mg/cm² | Brownish |
| A - 2 | +5 mg/cm² | " |
| A - 3 | +6 mg/cm² | " |
| A - 4 | +5 mg/cm² | " |
| A - 5 | +6 mg/cm² | " |
| A - 6 | +6 mg/cm² | " |
| A - 7 | +5 mg/cm² | " |
| A - 8 | +3 mg/cm² | " |

What we claim:

1. A high-Al heat resistant coated steel comprising a base steel consisting essentially of, in weight percent, not more than 0.7% C, not more than 3.0% Si, not more than 2.0% Mn, 10 to 40% Ni, 9 to 30% Cr, 2 to 8% Al, with balance being Fe and unavoidable impurities, and an Al coating formed on the base steel.

2. A high-Al heat resistant coated steel comprising a base steel consisting essentially of, in weight percent, not more than 0.7% C, not more than 3.0% Si, not more than 2.0% Mn, 10 to 40% Ni, 9 to 30% Cr, 2 to 8% Al, with balance being Fe and unavoidable impurities, and a high-Al alloy layer formed on the base steel.

3. A high-Al heat resistant coated steel according to claim 1, in which the Al coating is formed by an Al hot dipping process.

4. A high-Al heat resistant coated steel according to claim 1, in which the aluminum is formed by an electro-aluminum plating process.

5. A high-Al heat resistant coated steel according to claim 1, in which the aluminum coating is formed by a calorizing process.

6. A high-Al heat resistant coated steel according to claim 1, in which the aluminum coating is formed by a metallizing process.

7. A high-Al heat resistant coated steel according to claim 2, in which the high Al alloy coating is formed by heating the high-Al heat resistant steel with the Al coating thereon at a temperature above 500° C.

8. A high-Al heat resistant coated steel according to claim 1, in which the Al coating is 1 to 500 μm in thickness.

9. A high-Al heat resistant coated steel according to claim 1, in which the Al coating is partially alloyed with the base steel.

10. A high-Al heat resistant coated steel according to claim 1 wherein the base steel has the composition 0.078% C, 0.53% Si, 1.54% Mn, 23.2% Ni, 22.4% Cr, 2.10% Al, 0.3% Ti with the balance being Fe and unavoidable impurities.

11. A high-Al heat resistant coated steel according to claim 1 wherein the base steel has the composition 0.15% C, 0.63% Si, 0.74% Mn, 35.3% Ni, 12.0% Cr, 6.79% Al, 0.79% Mo, 0.05% Ce with the balance being Fe and unavoidable impurities.

12. A high-Al heat resistant coated steel according to claim 1 wherein the base steel has the composition 0.45% C, 1.07% Si, 0.53% Mn, 28.3% Ni, 15.2% Cr, 7.58% Al, 0.05% Ce, 0.01% La, 0.001% Ca with the balance being Fe and unavoidable impurities.

* * * * *